Patented May 25, 1948

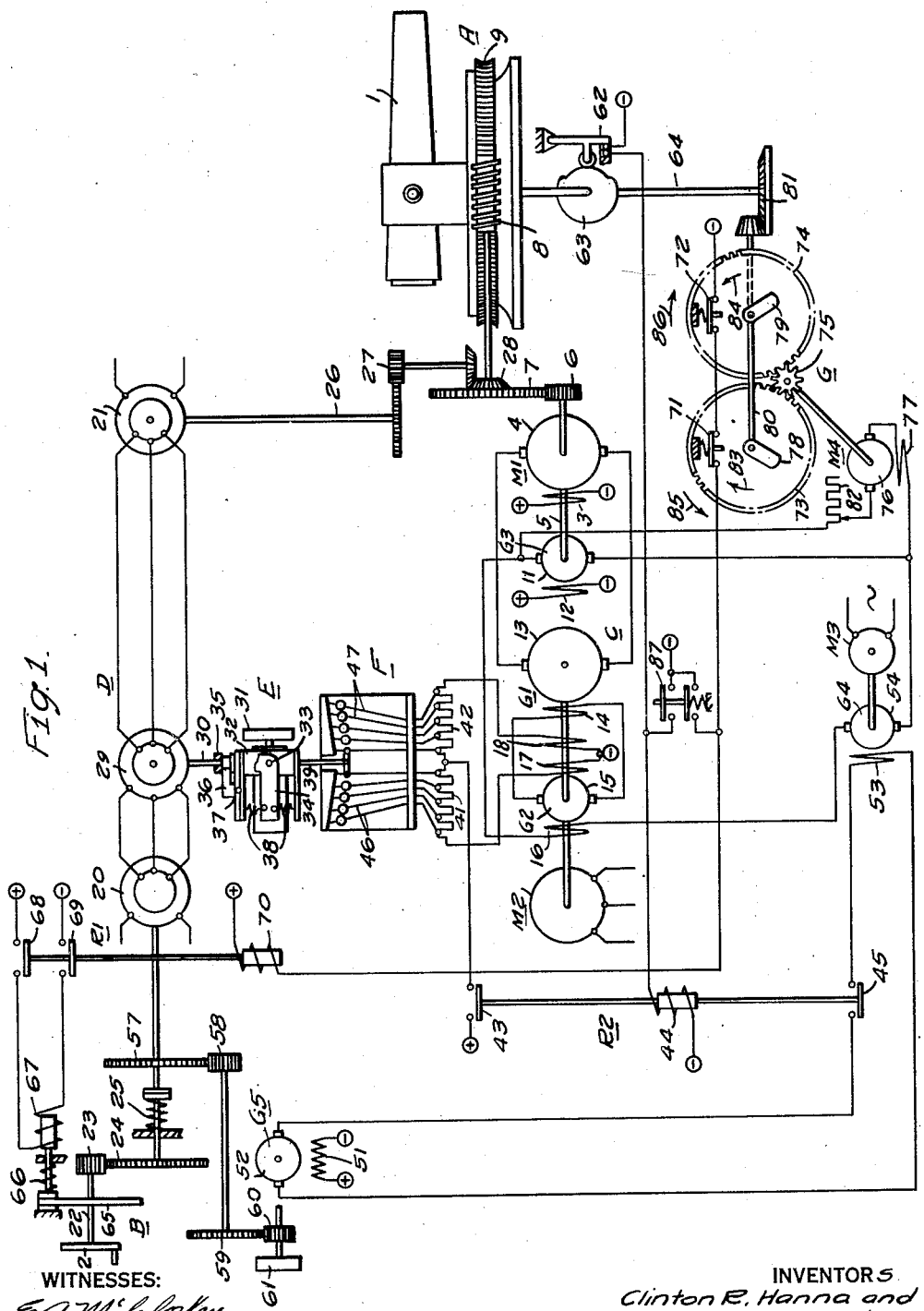

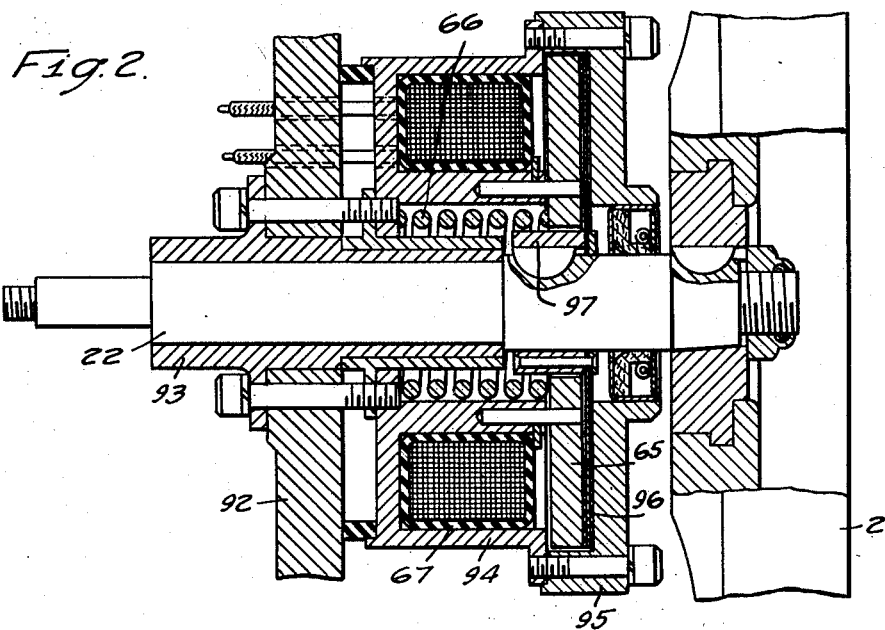
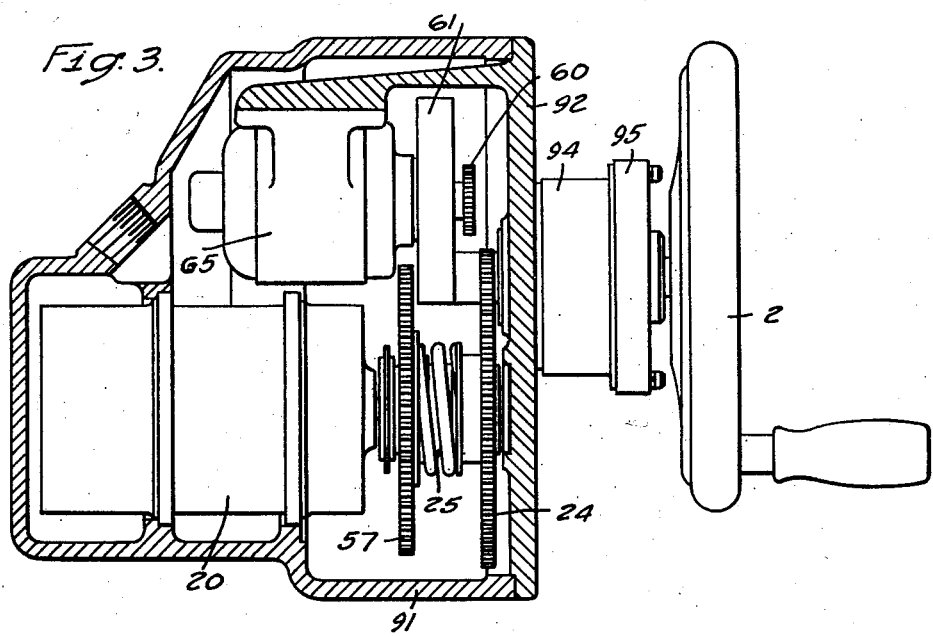

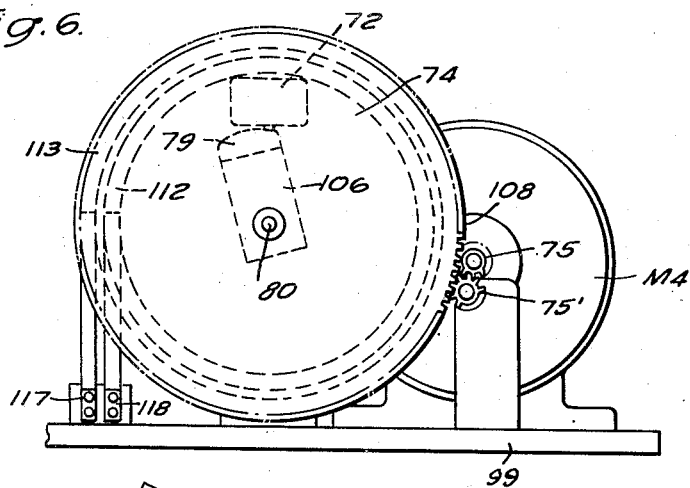
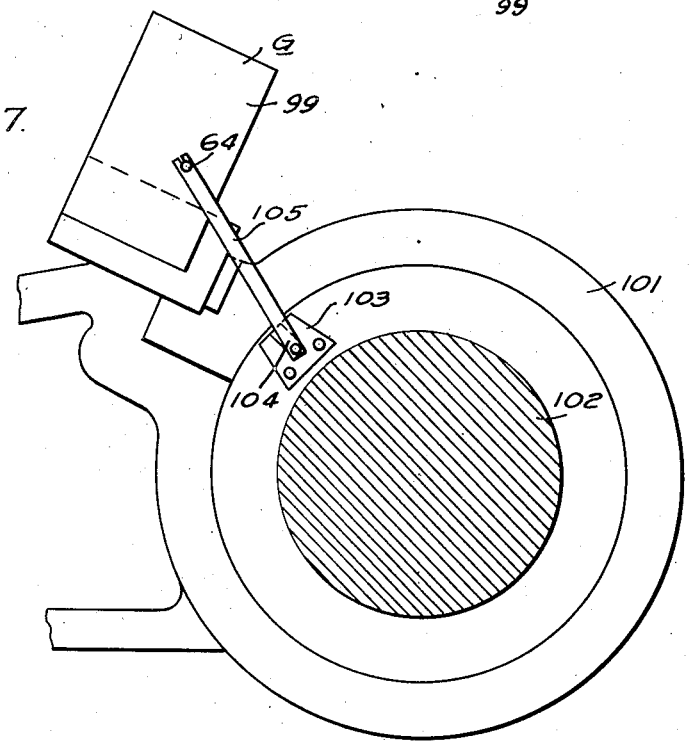

2,442,001

UNITED STATES PATENT OFFICE 2,442,001

SPEED RESPONSIVE LIMIT CONTROL

Clinton R. Hanna and Stanley J. Mikina, Pittsburgh, Pa., assignors to Westinghouse Electric Corporation, East Pittsburgh, Pa., a corporation of Pennsylvania Application October 12, 1946, Serial No. 703,046

14 Claims. (Cl. 318—30)

The invention relates to limit controls for electric drives and, in one of its aspects, to limit controls for follow-up drives of variable speed.

Such limit controls serve to deenergize the electric drive of a driven structure or mechanism and to stop the latter when its position reaches given limit locations determined by corresponding limit switches. When the drive operates at variable speeds and is set to move the driven structure at a relatively high speed, or when the driven structure is heavy, it may occur with the known limit controls that the driven structure reaches the limit switches at or near top speed, and due to its momentum coasts past the limit switches into the mechanical stop means or buffers. The jarring or impact thus caused may result in high overloads on the drive mechanisms or the driven structure and hence may lead to permanent distortion or other damage.

It is an object of our invention to provide limit control means for electric drives that prevent the just-mentioned inadequacies of the known systems and thus secure a smooth operation without danger of damage to the drive or the structure operated thereby.

Another object of the invention is to devise a variable speed follow-up drive for positioning heavy objects at high speed which affords a substantially constant deceleration of the driven structure when the latter approaches its limit positions regardless of the speed with which this approach is carried out.

A still further object of the invention, subsidiary to the foregoing, is to devise transmitting apparatus for positioning systems in which the operator is automatically prevented from actuating the transmitter at excessive speed or beyond a certain limit when the moving conditions of the driven structure or of the appertaining follow-up drive are such as to involve the danger of jarring stops.

Still further objects of the invention aim at a provision of control apparatus of compact and sturdy design and of great reliability of operation so that they are favorably suitable for application under exacting conditions as occurring, for instance, in gun positioning systems.

According to one of the essential features of our invention, we provide an electric drive system with limit control means which are operated by means of limit switches of such design and function that the point at which the limit control becomes effective is shifted automatically relative to the path of travel of the driven structure in dependence upon the speed of that structure. More particularly, the limit controls according to the invention are so designed that when the driven structure moves at a high speed toward a limit control contact, this contact is shifted away from an extreme location toward the moving structure; and in accordance with another feature of the invention, the distance of shift is maintained substantially proportional to the square of the speed. As a result, when the driven structure moves at a higher speed, a longer stopping and braking distance is available than when it moves at slower speed, and the increased distance is preferably such as to permit a substantially constant deceleration of the structure until it stops near or at the intended extreme position.

These and other objects and features of the invention will be apparent from the following description of an embodiment illustrated in the drawing. While the illustrated embodiment relates to a positioning system for heavy guns, it should be understood and will be obvious that the principles and essential features of the invention are similarly applicable to electric drives of different types and for different purposes, for instance, in machine tools or other fabricating machinery.

Figure 1 of the drawings shows diagrammatically a complete gun positioning system designed for a limit control according to the invention;

Fig. 2 shows a cross-sectional view of a portion of an operator-actuated control or transmitting apparatus appertaining to the system shown in Fig. 1;

Fig. 3 is another and more complete view of the same controlling or transmitting apparatus showing the element of Fig. 2 in plan view and in conjunction with other elements of the apparatus;

Fig. 6 is a view of the devices according to Fig. 4 taken from the right-hand side of Fig. 4; and Fig. 7 shows the device according to Figs. 4, 5 and 6 as a whole, in conjunction with the gun trunnion and the means for coupling the trunnion to the limit switch device.

Figure 4:
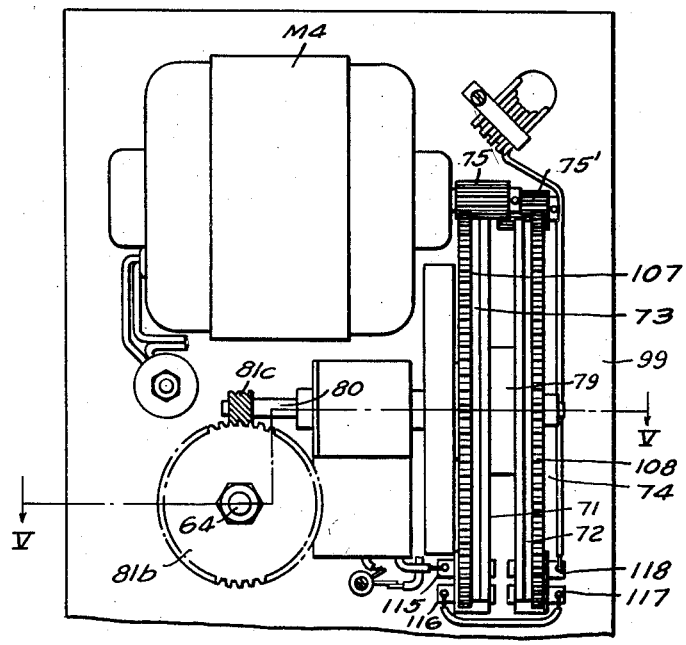
Fig. 4 is a top view, with the cover removed, of a limit switch device also appertaining to the system of Fig. 1.

In order to facilitate understanding the following detailed description of the positioning system shown in Fig. 1, a brief survey over the main devices of this system and their functional correlations will first be given.

In Fig. 1, the controlled structure is denoted as a whole by A. This structure is represented as a gun mount and the output member proper is a heavy gun 1.

The primary control apparatus, as a whole, is located at B and includes the input member 2 of the system here shown as a hand crank. The function of the system is to position the structure A, and in particular the output member or gun 1, by a follow-up motion in accordance with the adjustment or motion of the input member 2.

The power for adjusting the structure A is provided and controlled by a variable voltage drive with appertaining dynamo-electric control and regulating machinery, this whole group of machinery being generally denoted by C. The group includes a variable-voltage direct-current main motor M1 geared to the gun mount, a main generator G1 for energizing the main motor M1, an auxiliary constant-speed motor M2 for driving the generator, further a regulating generator G2 and an exciter G3 which cooperate with generators G4 and G5 to control and regulate the field excitation of the main generator G1.

A synchro-tie system, generally denoted by D is interposed between the controlled structure A and the controlling apparatus B in order to bias a gyroscopic sensing device E in accordance with any positional disagreement between structure A and apparatus B. The gyroscopic device E controls a resistance-type regulator F which, in turn, controls the regulating generator G2 to stimulate in the main generator G1 any corrective voltage change that may be needed to make the main motor M1 correct the disagreement.

A limit switch unit G, controlled on the one hand by the controlled structure A and on the other hand by a torque motor M4 connected to the control system appertaining to the variable voltage drive C, serves to actuate a relay R1 for controlling an electromagnetic brake that, when operative, prevents rotation of the hand crank on input member 1. This switch unit G and the associated circuits and devices joining it with the other apparatus groups and circuits of the system are characteristic of the essential features of the present invention proper.

A more detailed description of the system will now be given.

In Fig. 1, the symbols + and − represent, respectively, positive and negative terminals connected to a source of substantially constant voltage such as an exciter. Thus, the field winding 3, associated with the armature 4 of the main drive motor M1, receives constant excitation from the indicated terminals. The armature 4 is carried by a shaft 5 connected by suitable transmission mechanism to the output member 1. For example, the shaft 5 has a pinion 6 meshing with a gear 7 which drives a worm 8 meshing with a worm gear 9 to which is connected the output member 1. Shaft 5 carries also the armature 11 of the generator G3 whose field winding 12 receives constant excitation.

The main generator G1 has its armature 13 connected to the main motor armature 4. The field winding 14 of the main generator is excited from the armature 15 of the regulating generator G2 whose field is controlled by field windings 16, 17 and 18, the field windings 17 and 18 being differentially related to each other and mutually balanceable. Armatures 13 and 15 have a common shaft driven by the constant-speed motor M2.

Under control by the regulating generator G2, the main generator G1 is capable of driving the main motor M1 in opposite directions to cause the output member to follow the input member 2 or to drive it into positional agreement with the latter. This follow-up performance is controlled in response to movement of the input member and also in proportion to the velocity of deviation of the input member 2 with respect to the output member 1, and in further dependence upon the speed of the input and output members. The control in proportion to the speed of the input member provides compensation for the error otherwise existing on account of speed. The control in response to the speed of the output member acts in opposition to the input-responsive control in order to provide for damping of the regulator, this damping being increased because of torques developed and opposes any vibrational tendency of the output member or regulator mechanism.

Referring first to the sensing of input motion and the velocity of deviation of the input member with respect to the output member, the controlling mechanism, at B, and the controlled mechanism, at A, are mechanically connected to electrical transmitters 20 and 21, respectively, of the synchro-tie system D. The connection of transmitter 20 with the input member 1 extends through the crank shaft 22, two gears 23, 24 and a spring-biased friction clutch 25. The connection of transmitter 21 with the output member 1 extends from the transmitter shaft 26 through gear trains 27 and 28. The two transmitters are electrically connected to the differential receiver 29 of the synchro-tie system D, and the output shaft 30 of the receiver is connected to the gyroscopic device E.

The gyro E has first and second axes which are transverse to each other and to the spin axis, the first axis being the axis of the receiver output shaft 30, and the second axis being the precession axis which is normal both to the first axis and to the spin axis of the gyro rotor 31.

The rotor 31 is journalled in a casing or inner frame 32 and the latter is pivoted, at 33, to an outer frame 34 which has a pivotal connection 35 with respect to the shaft 30. A coupling, comprising cooperating members 36 and 37 attached to the output element 30 and to the inner frame 32, provides for displacement of the gyro about its first or input axis. Velocity of the gyro about the input axis, namely, the axis of the shaft 30, is accompanied by proportional torque about the second axis, that is, the output or precession axis defined by the axis of the pivot 33.

The coupling members 36 and 37 are designed to provide the necessary freedom for movement about the precession or output axis. Centering springs 38 connect the inner and outer frames 32 and 34 and provide a scale effect so that the extent of movement about the output or precession axis is proportional to the torque about the latter axis and is, therefore, proportional to the velocity of displacement or deviation about the first or input axis. Friction surfaces (not shown) are provided to become effective for damping precessional oscillations. The inner frame 32 of the gyro has an actuator 39 which moves, in response to angular displacements of the gyro about its first or input axis and its second or output axis, to vary the adjustment of the regulator F in opposite directions.

The regulator F has two series-connected and tapped resistors 41 and 42 mid-point-connected to the positive terminal of the above-mentioned source of constant direct-current voltage under control by the contact 43 of a limit relay R2 whose coil 44 controls also a contact 45. The two remaining terminals or resistors 41 and 42 are connected to the ends of the series-connected field windings 17 and 18 respectively. The tap points of resistors 41 and 42 have attached thereto groups of contacts 46 and 47 which are arranged for progressive engagement and disengagement to shunt or include portions of the resistors in circuits of windings 17 and 18. The groups of contacts 46 and 47 are arranged in relation to the actuator 39 so that movement of the latter in opposite directions causes the voltages in the two windings 17 and 18 to vary differentially in opposite directions. These voltage variations cause the regulating generator G2 to generate a correspondingly variable and reversible field excitation for the main generator G1. If, for example, the contacts 47 are progressively engaged, then portions of the resistor 42 are progressively shunted to impress progressively increasing voltage on the winding 18. With movement of the actuator 39 in the other direction, causing a progressive engagement of the contacts 46, a progressively increasing voltage is impressed on the winding 17. As the contacts are progressively disengaged, the voltages are progressively diminished.

The field winding 16 of the regulator G2 has voltages impressed thereon which are proportional to the speed of the controlling mechanism, at B, and the controlled mechanism, at A. Excitation of the winding 16 in proportion to speed of the controlling mechanism B occurs in such a direction as to maintain speed of the driving motor M1, while excitation of winding 16 in proportion to speed of the controlled mechanism A opposes velocity of motor M1 and thus has a damping effect. In order to excite the field winding 16 in proportion to speeds of the input member, the auxiliary generator G5, field-excited by a winding 51, has its armature 52 connected across the field winding 53 of the auxiliary generator G4 under control by contact 45 of limit relay R2. The armature 54 of generator G4 is driven at constant speed by a motor M3 and electrically connected to the field winding 16. In order to provide bucking excitation for field winding 16 in proportion to speed of the controlled mechanism A, the armature 11 of the auxiliary generator G3, driven at variable speed by the main motor M1, is also connected to the field winding 16 but lies in series-opposition to the armature 54 of generator G4.

In usual variable-voltage drives, employing a variable voltage generator and a drive motor, the generator field excitation must increase with speed as well as load for obtaining stable driving conditions. In the above-described system according to the invention, the error which would otherwise result from speed is compensated by the auxiliary generators G5 and G4 controlled by the input element and arranged to supply the part of the excitation required for maintaining speed. As the voltage of generator G5 is proportional to the rate at which the lines of flux are cut, it will be apparent that the voltage output of generator G5 as well as the amplified output voltage of generator G4 are a function of velocity of the input member. In a similar manner, the auxiliary generator G3 provides a voltage which is a function of the velocity of the controlled member, but since this voltage acts in opposition to that of generator G4, it serves to damp velocity oscillations of the driven mechanism with the result that overtravel, hunting or oscillation of the latter is avoided.

The mechanical connection between armature 52 of generator G5 and the input member 1 is shown to include the above-mentioned gears 23, 24. Gear 24 is connected through the frictional slip clutch coupling 25 with the step-up gear trains 57, 58 and 59, 60. Gear 60 drives the armature 52 as well as a fly wheel 61. The friction clutch 25 prevents acceleration or retardation in excess of a fixed maximum which may be adjusted by calibrating the relation of friction torque to flywheel inertia.

The above-described functioning of the system requires that the limit relay R2 be closed. The coil 44 of this relay is energized under control by a limit switch 62 under control by a cam 63 on the shaft 64 of the controlled mechanism A. Switch 62 remains closed and, hence, causes relay R2 to stay closed, as long as the position of mechanism A is within its proper range of movement. When the mechanism moves beyond its extreme limit positions, switch 62 causes relay R2 to drop out and to arrest the drive. A power brake (not shown) may be provided to then secure a quick stopping of motor M1 under control by the limit switch 62.

Especially if the controlled mechanism is heavy, the just-mentioned devices alone are inadequate to secure a satisfactory limit control when the input member 1 is very rapidly operated, because the controlled mechanism may then be thrown too rapidly toward its end position and, by its momentum, may cause jarring and damage. In order to prevent this, the control mechanism B is provided with a brake under control by the limit switch unit G. The brake has a brake disk 65 mounted on the shaft 22 of the input member 1. The brake is set by a spring 66 and magnetically releasable by a coil 67 whose energizing circuit is controlled by the contacts 68 and 69 of the brake relay R1. The control coil 70 of relay R1 is energized under control by two series-connected and normally closed contacts 71 and 72 which are mounted on respective rotatable carriers 73 and 74 that are in meshing engagement with a spur gear 75 drivable from the armature 76 of a torque motor M4. Armature 76 and the appertaining field winding 77 are connected in series with an adjusting rheostat 82 across the armature 11 of the damping generator G3 to be excited in proportion to the speed of the output mechanism A. Two cams 78 and 79 are provided for actuating the contacts 71 and 72 respectively. Cams 78 and 79 have a shaft 80 geared, at 81, to the shaft 64 of the controlled mechanism A.

When mechanism A moves in one direction, cam 78 rotates in the direction of the arrow 83 to eventually open the contact 71. When mechanism A moves in the opposite direction, cam 79 rotates in the direction of the arrow 84 to eventually open the contact 72. The two contact carriers 73 and 74 are biased so that the contacts 71 and 72 tend to remain in the illustrated locations. Due to the torque of motor M4, however, the contact carriers are moved in the direction of the arrows 85 and 86 respectively in dependence upon the speed of the output mechanism. As a result, the cams 78 and 79 will engage and open the respective contacts 71 and 72 at an earlier point of travel of the controlled mechanism A when this mechanism travels at high speed, while the contact opening occurs at a later point when the travelling speed is low.

Since the voltage applied from generator G3 to the series torque motor M4 is proportional to the velocity of mechanism A, the torque produced by motor M4 is substantially proportional to the square of the mechanism or gun speed. This torque, acting against the constant bias of the contact carriers 73 and 74, causes these carriers to rotate through an angle proportional to the square of the gun speed. The angular advance of the switch contacts 71 and 72 causes the tripping cams 78 and 79 to open the contacts while the moving gun is still away from the extreme limits of travel (determined by the limit switch 62 and cam 63) an angular distance proportional to the square of the gun speed.

When switch 71 or 72 is opened, the brake relay R1 drops out and opens the circuit of the brake release coil 67. The brake spring then applies the brake to stop the hand crank 2 from further rotation by the operator. The stopping of the position-comparing synchro-tie system D and of the hand wheel generator G5 in a time determined by the slip clutch 25 causes the drive to bring the gun to a stop with uniform deceleration as determined by the setting of the transmitter slip couplings.

The torque motor's characteristic of torque proportional to the square of the gun speed is the proper one for insuring that the hand crank 1 is stopped soon enough to provide the gun with the necessary angular distance in which to stop under the deceleration determined by the fly-wheel and slip-clutch setting of the controlling mechanism B. Since the gun angle $\theta$ required for stopping from an initial velocity of $\omega$ with a deceleration $\alpha$ is $$\theta = \frac{\omega^2}{2\alpha}$$

The advance of the contacts 71 and 72 through an angle proportional to $\omega^2$, and the consequent immediate stopping of the hand crank 2 by the brake, provide automatically the stopping distance $\theta$ as required by the gun speed $\omega$.

For instance, if the maximum gun speed is 12° per second and the maximum allowable deceleration is 4° per second, the required gun travel to stop from top speed is $$\theta = \frac{12^2}{2 \times 4} = 18°$$

If, for instance, the movement of the tripping cams 78, 79 is stepped up 6:1 from the gun travel, the two contacts 71 and 72 must move out an angular distance of $6 \times 18° = 108°$ from the positions corresponding to the extreme limits of gun travel in order to lock the hand crank when the gun is 18° away from the end, for the case of top speed. At half speed, for instance, the required gun stopping distance is one quarter of the one above mentioned or 4½°, and so on.

A push-button switch 87, shunting the limit switch contacts 71 and 72, is provided and preferably associated with the controlling mechanism B for releasing the brake and closing the limit relay R2 in order to back the gun off from the tripped limit switches.

By virtue of the limit device G, in conjunction with the brake controlled thereby, it is impossible to drive the gun or let it coast past the desired extreme limits into the mechanical stop elements or buffers. Hence, jarring stops are avoided under all conditions of operation thus eliminating the danger of overloads on the drive, gearing and structure that might otherwise produce permanent distortion or other damage.

Referring to Figs. 2 and 3, design features of a controlling transmitter corresponding to the mechanism B of Fig. 1 will now be described more in detail.

The input member, consisting of a hand crank wheel 2, is firmly secured to the input shaft 22 of the transmitter mechanism. The housing 91 of the mechanism has a top portion 92 which carries a bushing 93 in which the input shaft 22 is journalled. Attached to the portion 92 of the housing is a casing 94 for a brake release coil 67. A cover plate 95 is firmly mounted on the casing 94 and carries on its interior surface a group of friction members 96 to cooperate with a brake disk 65. This disk acts as an armature for coil 67 and is mounted on a bushing 97 which is firmly attached to the input shaft 22. The disk 65 is so guided as to be axially displaceable relative to the bushing 97. The brake spring 66 rests at one end against the casing 94 and at the other end against the disk 65 in order to force the latter into frictional engagement with the friction members 96. Hence, as long as the coil 67 is de-energized, the brake is set and prevents the crank wheel 2 from being rotated by the operator, as explained previously in conjunction with Fig. 1.

Driven from the input shaft by a gear 23 (see Fig. 1, not shown in Figs. 2 and 3) is a spur gear 24 (Fig. 3) which is coupled through a friction clutch 25 with the synchro-tie transmitter 20. The same friction clutch also couples the gear 25 with a spur gear 57, which in turn drives a pinion 60 (through intermediate gears 58 and 59 not shown in Fig. 3 but represented in Fig. 1). The shaft of pinion 60 carries the fly wheel 61 and drives the speed measuring generator G5.

The above described control transmitter shown in Figs. 2 and 3 is in accordance with the principles of the transmitter B in Fig. 1 and functions in the manner previously described so that a further explanation relative to Figs. 2 and 3 is unnecessary.

A design for a limit switch device G of Fig. 1 is exemplified by Figs. 4 through 7 and described hereinafter.

Referring at first to Fig. 7, the limit switch device is shown to be located at G. The shaft 64 appertaining to this device, as more clearly apparent from Fig. 1, is likewise visible in Fig. 7. While in Fig. 1 the shaft 64, for the sake of simplicity, is illustrated as if it were an extension or part of the gun trunnion, this shaft is preferably coupled with the gun trunnion by a suitable intermediate mechanism, and such a mechanism is illustrated in Fig. 7.

According to Fig. 7, the limit switch device G has its base plate 99 firmly mounted on the journalling or supporting structure 101 of the gun trunnion 102. The trunnion 102 carries a guide member 103 which has a radially extending slot. This slot is engaged by a roller journalled at the end 104 of an arm 105 whose other end is firmly secured to the shaft 64 of the limit switch device G. When the gun trunnion 102 revolves, the guide member 103 causes rotation of the arm about the axis of the shaft 64 so that the shaft 64 revolves in a fixed positional and speed relation to the gun trunnion 102.

According to Fig. 4, the shaft 64 carries a worm gear 81b meshing with a worm 81c. Parts 81b and 81c correspond as to location and function to the gearing 81 shown in Fig. 1. Worm 81c is mounted on the shaft 80 which carries a member 106 (Fig. 5) that is integral with the two cams 78 and 79 for actuating the respective limit contacts 71 and 72. These contacts are mounted on carriers 73 and 74, respectively, which are freely revolvable about the shaft 80 and are provided with respective gearings 107 and 108. The gearing 107 is engaged by a pinion 75 on the shaft of the torque motor M4 (Fig. 4) and meshes with another pinion 75' so that the latter revolves in the opposite direction. Pinion 75' drives the gearing 108 of the contact carrier 74.

Figure 5:
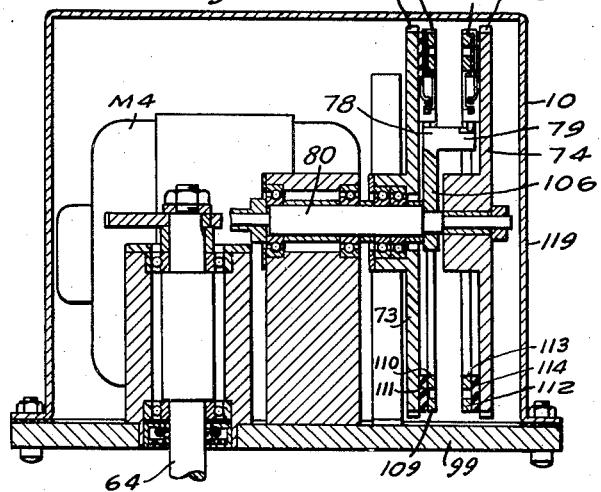
Fig. 5 is a sectional view through the device of Fig. 1, the section being taken along the dash and dot line denoted in Fig. 4 by V—V.

The carrier 73 is provided with two slip rings 109 and 110 mounted on an insulating carrier 111. Similarly, the carrier 74 has two slip rings 112 and 113 mounted on an insulating member 114 (Fig. 5). These slip rings are connected with the appertaining contacts 71 and 72 and are engaged by contact brushes attached to terminals 115, 116, 117 and 118 respectively (Figs. 4 and 6). The terminals serve for connecting the limit contacts to the appertaining control circuit shown in Fig. 1 and described in the foregoing. A protective cover 119 (Fig. 5) is mounted on the supporting plate 99 of the device.

During the operation of the system, the movement of shaft 64, derived from that of the gun trunnion, causes the shaft 80 (Figs. 5, 6 and 7) to actuate the cams 78 and 79, while the torque developed by the motor M4 acts to move the two contact carriers 73 and 74 in opposite directions (Fig. 4). Consequently, the performance of the limit switch device represented in Figs. 4 to 7 is in accordance with the explanations given in the foregoing relative to Fig. 1.

It will be understood by those skilled in the art that limit control systems and operators according to our invention can be modified and pointed out in various respects and may be embodied in electric drives and appertaining devices other than those specifically illustrated and described in this disclosure without departing from the essence of our invention and in accordance with the essential features of the invention as set forth in the claims annexed hereto.

We claim as our invention:

1. In combination, a movable structure, an electric drive system connected to said structure for positioning the latter, limit control means correlated to the path of movement of said structure and connected to said system for stopping said structure when the latter reaches a limit position, said limit control means having adjusting means for shifting said position relative to said path, and speed-responsive control means connected to said adjusting means for controlling the latter to shift said limit position in opposition to the moving direction of said structure in dependence upon the speed of said structure.

2. In combination, a movable structure, an electric drive system connected to said structure for positioning the latter, a limit control device having two relatively movable members connected to said system for controlling it to stop said structure when the latter reaches a limit position, one of said members being connected to said structure to move in proportion to the movement of said structure, control means responsive to the speed of said structure and connected to said other member for moving it in dependence upon the speed of said structure in the direction required to shift said limit position in opposition to the direction of movement of said structure.

3. In combination, a movable structure, a variable-voltage drive system having a motor connected to said structure for positioning the latter, limit control means correlated to the path of movement of said structure and connected to said system for stopping said structure when the latter reaches a limit position, said limit control means having adjusting means for shifting said position relative to said path, and a generator connected to said motor for producing a voltage proportional to the speed of said structure and connected to said adjusting means for controlling the latter to shift said limit position in opposition to the moving direction of said structure in dependence upon the speed of said structure.

4. In combination, a movable structure, an electric drive system connected to said structure for positioning the latter, limit control means correlated to the path of movement of said structure and connected to said system for stopping said structure when the latter reaches a limit position, said limit control means having adjusting means for shifting said position relative to said path, circuit means for providing a voltage substantially proportional to the speed of said structure, and a torque motor mechanically connected with said adjusting means for controlling the latter and being electrically connected to said generator to be energized by said voltage so that said limit position is shifted in opposition to the direction of movement of said structure substantially in accordance with the square of said speed.

5. In combination, a movable structure, an electric drive system connected to said structure for positioning the latter, a limit control device having two relatively movable members connected to said system for controlling it to stop said structure when the latter reaches a limit position, one of said members being connected to said structure to move in proportion to the movement of said structure, circuit means for providing a voltage substantially proportional to the speed of said structure, and a torque motor mechanically connected with said other member for moving it in the direction required to shift said limit position in opposition to the direction of movement of said structure substantially in proportion to the square of said speed.

6. In combination, a controlling input member, a controlled output member, a follow-up drive connected between said input member and said output member to move the latter in positional agreement with the former, a brake for stopping said input member, limit switch means associated with said output member to control said brake to stop said input member when said output member reaches a limit position and having adjusting means for displacing said position, and control means responsive to the speed of said output member for causing said adjusting means to displace said position in opposition to the direction of movement of said output member with increasing speed of the latter.

7. In combination, a controlling input member, a controlled output member, a follow-up drive connected between said input member and said output member to move the latter in positional agreement with the former, said drive having a variable-speed motor in driving connection with said output member, a generator mechanically connected with said motor to provide a control voltage indicative of the motor speed, a brake for stopping said input member, limit switch means associated with said output member for controlling said brake to stop said input member when said output member reaches a limit position, and having adjusting means for displacing said position, said adjusting means being connected to said generator and controlled by said voltage to displace said position in opposition to the direction of movement of said output member with increasing values of said speed.

8. In combination, a controlling input member, a controlled output member, a follow-up drive connected between said input member and said output member to move the latter in positional agreement with the former, said drive having a variable-speed motor in driving connection with said output member and including a main generator for providing variable energization for said motor and a regulating generator for supplying variable field excitation for said main generator to thereby control said energization, a synchrotie system having transmitters connected to and controlled by said input member and said output member respectively and having a receiver connected to said regulating generator to control the latter in accordance with positional disagreement between said two members, speed-increasing generator means connected to said input member and attached to said regulating generator for imposing a compensating control thereon tending to maintain the speed of said motor, a damping generator mechanically connected to said motor to provide a control voltage proportional to the motor speed and attached to said regulating generator for imposing an anti-limit damping control thereon, a brake for stopping said input member, limit switch means associated with said output member for controlling said brake to stop said input member when said output member reaches a limit position and having adjusting means for displacing said position, said adjusting means being connected to said damping generator and controlled by said control voltage to displace said position in opposition to the direction of movement of said output member with increasing values of said motor speed.

9. In combination, a controlling input member, a controlled output member, a variable-speed motor for driving said output member, a main generator for providing variable energization for said motor, a regulating generator for supplying variable field excitation for said main generator to thereby control said energization, a control system connecting said input member with said regulating generator for causing said motor to move said output member in positional agreement with said input member and including a damping generator mechanically connected to said motor for providing a control voltage proportional to the motor speed in order to damp oscillatory speeds of said motor, a brake for stopping said input member, limit switch means associated with said output member for controlling said brake to stop said input member when said output member reaches a limit position and having adjusting means for displacing said position, said adjusting means being connected to said damping generator and controlled by said control voltage to displace said position in opposition to the direction of movement of said output member with increasing values of said motor speed.

10. In combination, a controlling input member, a controlled output member, a variable-speed motor for driving said output member, a main generator for providing variable energization for said motor, a regulating generator for supplying variable field excitation for said main generator to thereby control said energization, a control system connecting said input member with said regulating generator for causing said motor to move said output member in positional agreement with said input member and including a damping generator mechanically connected to said motor for providing a control voltage proportional to the motor speed in order to damp oscillatory speeds of said motor, a brake for stopping said input member, limit switch means associated with said output member for controlling said brake to stop said input member when said output member reaches a limit position, said limit switch means having a movable carrier member and a contact mounted thereon and a movable cam member for actuating said contact when said limit position is reached, biasing means disposed in said limit switch means for biasing one of said latter members toward a given location corresponding to a desired extreme location of said limit position, one of said members of said limit switch means being mechanically connected to said output member to move in accordance with the latter, and a torque motor in driving connection with said other member of said limit switch means for moving it in opposition to said biasing means, said torque motor being connected to said damping generator to be energized by said control voltage in order to cause displacement of said limit position in opposition to the direction of movement of said output member substantially in proportion to the square of the speed of said output member.

11. Limit control means, comprising a structure to be positioned, two limit control members movable relative to each other and mutually engageable to effect limit control when in engaging position, one of said members being mechanically connected to said structure to move in correspondence with the latter, biasing means for biasing said other member toward a fixed end position, an electric torque motor connected with said other member to move the latter in opposition to said biasing means so as to then shift said engaging position away from said end position, and electric circuit means attached to said torque motor for engaging it in dependence upon the speed of said structure.

12. Limit control means, comprising an angularly adjustable shaft, a revolvable cam connected to said shaft to be driven thereby, a carrier revolvable coaxially to said cam, a switch mounted on said carrier and engageable by said cam to effect limit control when engaged by said cam, a spring for biasing said carrier toward a given end position, a torque motor in driving connection with said carrier for revolving it in opposition to said spring so as to displace the position of engagement between said switch and said cam away from said end position, and electric circuit means attached to said torque motor for energizing it in dependence upon the speed of said structure.

13. Limit control means, comprising an angularly adjustable shaft, revolvable cam means connected to said shaft to be driven thereby, two carriers revolvable coaxially to said cam means, two switches mounted on said respective carriers and engageable by said cam means in two angularly spaced respective limit positions to then effect limit control, spring means for biasing said carriers in opposite directions toward respective end positions determining a desired extreme range of angular movement for said shaft, a torque motor geared to said carriers to move them in mutually opposite directions when energized so as to thereby narrow the range of said angular movement, electric circuit means attached to said motor for supplying energization therefore, and electric circuit means attached to said switches to be opened and closed thereby for transmitting said limit control.

14. Control means for a follow-up positioning system, comprising a revolvable and manually actuable input member having a shaft, a friction clutch connected to said shaft, electric follow-up transmitter means connected to said clutch to be driven by said shaft through said clutch, a friction brake having an armature member mounted on said shaft, stationary structure to frictionally cooperate with said armature member, a spring for biasing said armature member against said structure, a brake release coil surrounding said shaft for attracting said armature member to release said brake, and circuit means attached to said coil for connection to the positioning system.

CLINTON R. HANNA.
STANLEY J. MIKINA.